(12) United States Patent
Rautio

(10) Patent No.: US 8,911,624 B2
(45) Date of Patent: *Dec. 16, 2014

(54) STACKED PLATES FILTRATION CARTRIDGE

(75) Inventor: Kevin Rautio, Manchester-By-The-Sea, MA (US)

(73) Assignee: EMD Millipore Corporation, Billerica, MA (US)

(*) Notice: Subject to any disclaimer, the term of this patent is extended or adjusted under 35 U.S.C. 154(b) by 523 days.

This patent is subject to a terminal disclaimer.

(21) Appl. No.: 12/733,959

(22) PCT Filed: Sep. 16, 2008

(86) PCT No.: PCT/US2008/010764

§ 371 (c)(1),
(2), (4) Date: Jul. 14, 2010

(87) PCT Pub. No.: WO2009/045269

PCT Pub. Date: Apr. 9, 2009

(65) Prior Publication Data

US 2010/0288690 A1    Nov. 18, 2010

Related U.S. Application Data

(60) Provisional application No. 60/997,492, filed on Oct. 3, 2007.

(51) Int. Cl.
*B01D 63/08* (2006.01)

(52) U.S. Cl.
CPC ............ *B01D 63/08* (2013.01); *B01D 2313/02* (2013.01); *B01D 2313/08* (2013.01); *B01D 2313/16* (2013.01); *B01D 2313/20* (2013.01); *B10D 2313/21* (2013.01)
USPC .. 210/321.75; 210/472; 210/498; 210/321.84

(58) Field of Classification Search
CPC ...... B01D 25/18; B01D 63/08; B01D 63/082; B01D 63/088; B01D 25/21; B01D 63/084
USPC ............. 210/321.64, 321.72, 321.75, 321.84, 210/224, 228, 229, 231, 232, 238, 323.1, 210/455, 456, 488, 492; 422/534, 535
See application file for complete search history.

(56) References Cited

U.S. PATENT DOCUMENTS 4,310,416 A * 1/1982 Tanaka et al. ............ 210/321.75
4,430,218 A * 2/1984 Perl et al. .................. 210/321.75

(Continued)

FOREIGN PATENT DOCUMENTS

| EP | 1091083 A1 | 4/2001 |
|---|---|---|
| EP | 1134355 A2 | 9/2001 |

(Continued)

OTHER PUBLICATIONS

International Search Report and Written Opinion received for PCT Patent Application No. PCT/US2008/01764, mailed on Jul. 8, 2008, 9 pages.

(Continued)

*Primary Examiner* — David C Mellon
*Assistant Examiner* — Pranav Patel
(74) *Attorney, Agent, or Firm* — EMD Millipore Corporation

(57) ABSTRACT

A filtration cartridge (20) is provided comprising one or a stack of filtration units (26) sealed to each other at their inner periphery and to end caps (22, 24) eliminating the need for a housing surrounding the stack. Fluid pathways are provided so that filtration of all incoming feed is assured prior to passing from the cartridge as filtrate. The filtration cartridge can be provided with a single outlet (30).

2 Claims, 5 Drawing Sheets

(56) References Cited

U.S. PATENT DOCUMENTS

| | | | |
|---|---|---|---|
| 4,440,247 A | 4/1984 | Sartor | |
| 4,501,663 A | 2/1985 | Merrill | |
| 4,624,784 A * | 11/1986 | Lefebvre | 210/321.67 |
| 4,940,562 A | 7/1990 | Watanabe et al. | |
| 5,575,910 A * | 11/1996 | Karbachsch et al. | 210/321.75 |
| 2006/0185901 A1 | 8/2006 | Sinor et al. | |

FOREIGN PATENT DOCUMENTS

| | | |
|---|---|---|
| FR | 2468397 A1 | 5/1981 |
| JP | 54-85186 A | 7/1979 |
| JP | 56-129016 A | 10/1981 |
| JP | 63-173308 U | 11/1988 |
| JP | 2001-507985 A | 6/2001 |
| WO | 98/30306 A1 | 7/1998 |
| WO | 03/031763 A1 | 4/2003 |
| WO | 2006/044711 A1 | 4/2006 |

OTHER PUBLICATIONS

International Preliminary Report on Patentability received for PCR Patent Application No. PCT/US2008/01764, Issued on Aug. 19, 2009, 7 pages.

* cited by examiner

LID

SID

STACKED PLATES FILTRATION CARTRIDGE

CROSS REFERENCE TO RELATED APPLICATIONS

This application is the U.S. National Stage Application of International Application No.: PCT/US2008/010764, filed on Sep. 16, 2008, which claims priority to U.S. Application No. 60/997,492, filed Oct. 3, 2007.

FIELD OF THE INVENTION

This invention relates to a filtration cartridge free of a separate exterior housing. More particularly, this invention relates to such a filtration cartridge having a single permeate pathway to a single permeate outlet from the filtration cartridge.

BACKGROUND OF THE INVENTION

Membrane filters of various polymeric materials are known and are generally thin porous structures having porosities between about 50-80% by volume. They are relatively fragile and are commonly used with various types of mechanical support or reinforcement. Flow rates of liquids through such membranes per unit of area are a function of pore size. To obtain high flow rates through filters with fine pores, for example below about one micron, relatively large filter areas are needed. Such areas have therefore been provided by using large individual filters or by using a number of smaller individual filters in parallel. For use in critical pharmaceutical applications such as sterilization, such membranes and their supporting apparatus must be free of leaks or defects capable of passing small particles or organisms.

Numbers of small filters have theretofore been hand-assembled for parallel flow with supporting plates and associated apparatus, then tested, and, if necessary, sterilized, often at the user's site at considerable cost and inconvenience. The operations must be repeated if the hand assembly fails the necessary tests. The mechanical parts of larger more complex filtration systems are generally cleaned and re-used with only the filters being replaced. One assembly heretofore provided in disposable plastic has also been mechanically secured with relatively few moveable parts.

Individual membrane filters of large area have been supported flat or cylindrically, or have been pleated for disposition in compact housings. Holders for flat membranes are large, for a given filter area, are usually not disposable, and also require disassembly, cleaning, reassembly and testing with each change of filter. Pleating of fragile membranes creates stress concentrations at the folds, permits flexing of the fragile membranes in use, normally requires interleaving flow screens on one or both of the upstream and downstream sides and requires potting and/or adhesives to seal the ends and overlapping seams. Because of concerns for possible failures at the folds, seams, or ends, a separate flat final filter is sometimes used in series with pleated cartridges for added assurance in critical applications, for example, in sterilizing pharmaceuticals and intravenous fluids. In addition, the use of a number of different materials in pleated cartridge construction increases the sources for extractables into the filtrate.

At the present time, filtration cartridges formed of rectangular membrane support plates are provided with a plurality of permeate outlets. This arrangement is undesirable since it requires a plurality of connection devices and conduits to recover the permeate.

U.S. Pat. No. 4,501,663 discloses a filtration cartridge formed from a plurality of stacked filtration modules and having a separate exterior housing. The cartridge is undesirable since it has a large hold up volume which results in sample loss.

U.S. patent application Ser. No. 60/925,774, filed Apr. 23, 2007 discloses a filtration cartridge having a feed inlet and a permeate outlet positioned at a central portion of the cartridge. This cartridge requires a fluid deflection plate to direct incoming fluid feed from a central portion of the cartridge to a peripheral portion of the cartridge. The inclusion of a deflection plate is undesirable since it adds a nonworking element to the cartridge.

At the present time an integrity test utilizes a binary gas for determining the presence of defects in membranes in a filtration cartridge. The test provides greater accuracy when the binary gas is flowed in a tangential flow filtration mode (TFF) rather than a normal flow filtration mode (NFF) (dead ended filtration). This integrity test is described in U.S. patent application Ser. No. 11/545,738, filed Oct. 10, 2006 which is incorporated herein by reference. Accordingly, when it is desired to effect NFF filtration within a filtration cartridge and to effect the integrity test, the filtration cartridge must be capable of being operated in both TFF and NFF modes.

Accordingly, it would be desirable to provide a filtration cartridge having a single feed inlet and a single permeate outlet for reasons of simplicity. In addition, it would be desirable to provide such a cartridge which can be operated in both TFF and NFF modes. Furthermore, it would be desirable to provide a filtration cartridge with a minimum of nonworking elements to reduce cost.

SUMMARY OF THE INVENTION

The present invention provides a filtration cartridge formed from one or a plurality of filtration units which are stacked and bonded to each other to assure fluid flow from an inlet to the filtration cartridge, through at least one membrane and through an outlet from the filtration cartridge. The cartridge is capable of being operated in both TFF and NFF modes. The filtration mode is dead ended, normal flow filtration (NFF). Each filtration unit comprises two membrane support plates sealed together at their outer peripheries to form a stack of filtration units. Each membrane support plate has a first surface and a second surface. A filtration membrane, such as a single membrane or a plurality of membranes is bonded to each of the first and second surfaces of each membrane support plate. The filtration cartridge is provided with end caps, a fluid inlet, a permeate outlet and a second outlet that functions as a vent. The end caps seal the cartridge and direct flow from the feed inlet, through the membranes and out the outlet. Permeate fluid flows through a single fluid pathway within the filtration cartridge so that, the filtration cartridge can be provided with a single outlet for permeate.

DESCRIPTION OF SPECIFIC EMBODIMENTS

Figure 1:
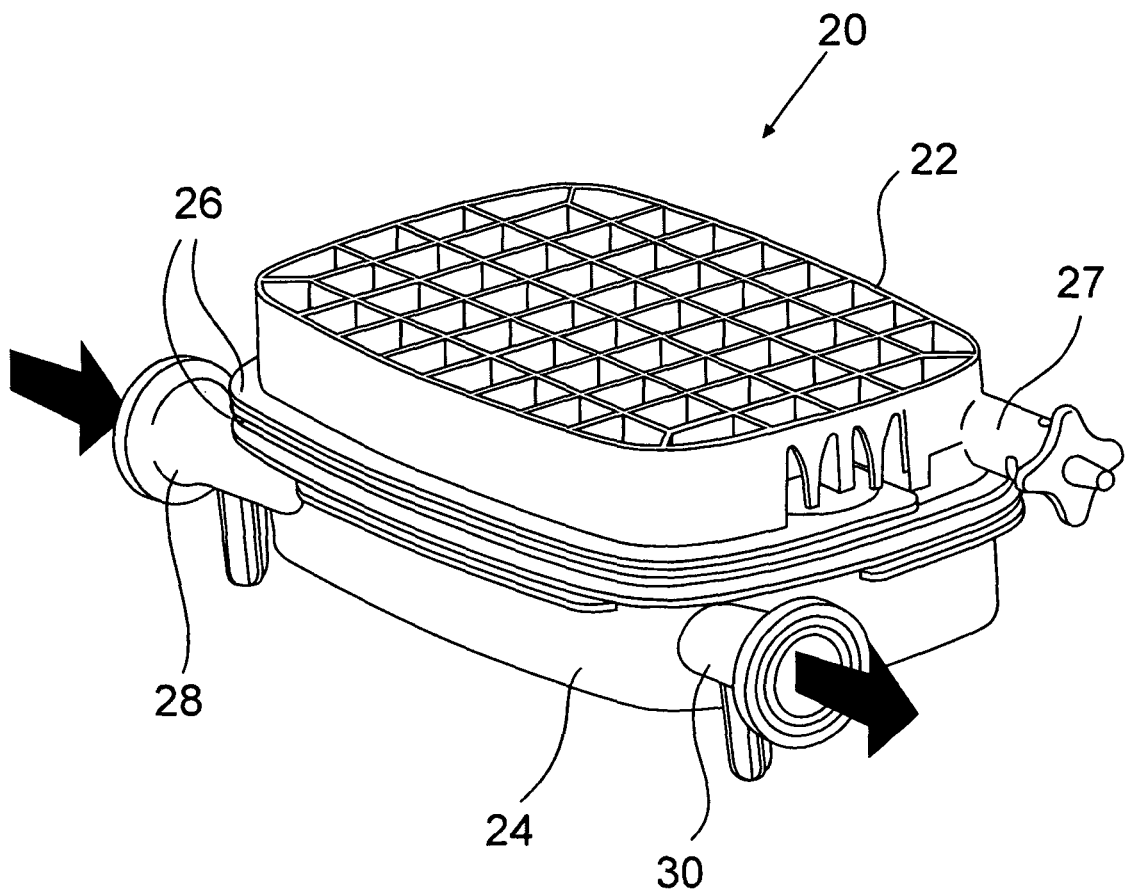
FIG. 1 is a perspective view of the filtration cartridge of this invention.

Referring to FIG. 1, a self contained filtration cartridge 20 having, for example, 0.015 square meters of filter area, is shown. The cartridge 20 comprises an upper end cap 22, a lower end cap 24, and a plurality of filtration units 26. Lower end cap 24 is provided with an inlet 28 for feed, an outlet 30 for permeate. Upper end cap 22 is provided with vent 27 to vent gas. Preferably the end caps 22 and 24 and the filtration units 26 are of the same plastic material and are selectively welded together such as with heat or solvent at their outer peripheries. The inlet 28, outlet 30 and vent 27 are respectively adapted for connection to a conduit of tubing or the like.

The vent 27 of any suitable type extends through the end cap 22 to permit the venting of air from the filtration cartridge at start-up and to permit venting of a gas to test for membrane defects when operating the filtration cartridge 20 in TFF mode. This may comprise, for example, a manually opening valve which is opened to exhaust gas and thereafter closed.

In use, a liquid to be filtered enters inlet fitting 28, passes into the stack of filtration units 26, passes through the filtration membranes within the stack of filtration units 26, as hereinafter described, from which the permeate passes out outlet fitting 30.

Figure 2:
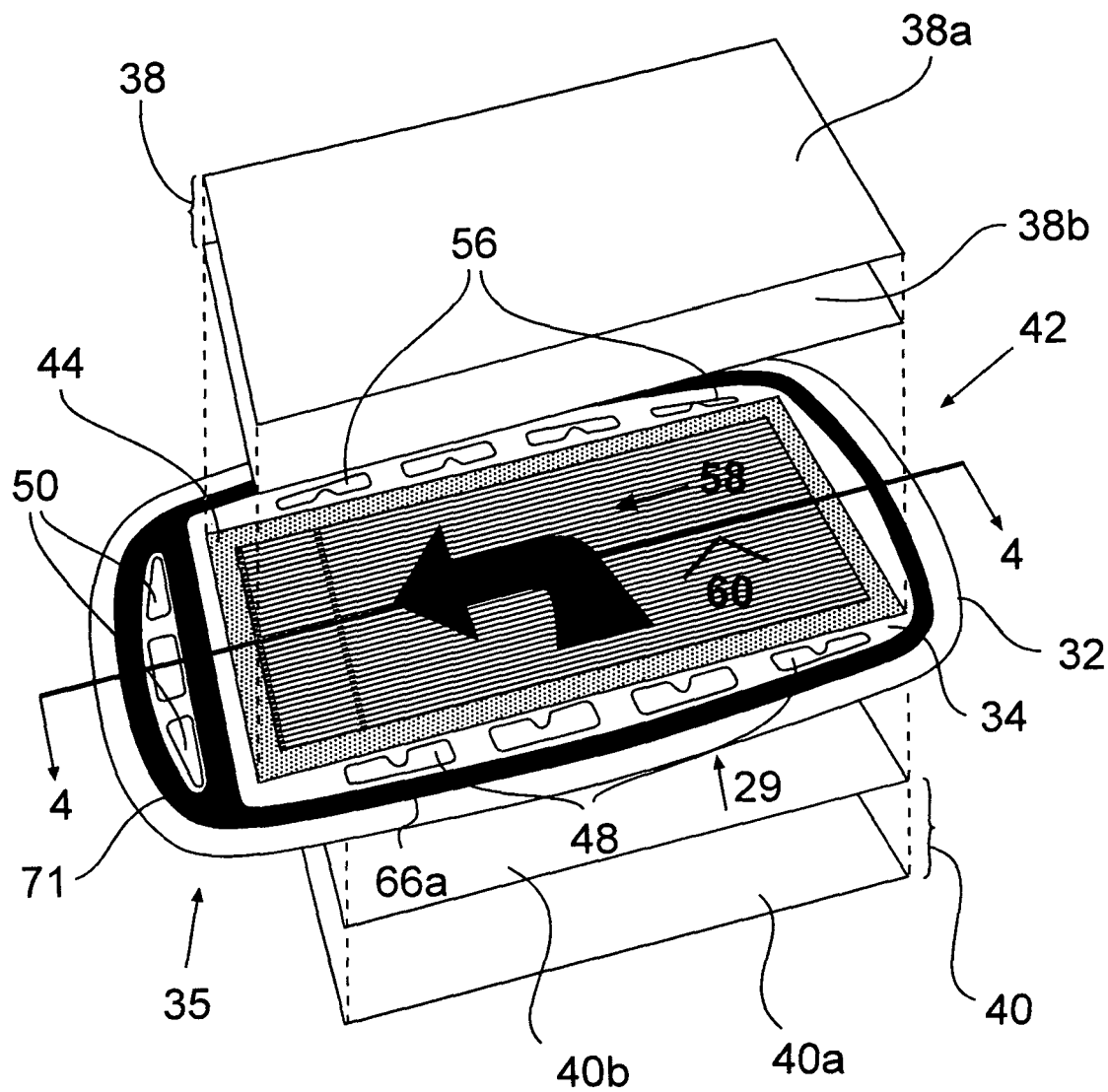
FIG. 2 is an exploded top view of a first surface of a membrane support plate of this invention.
Figure 3:
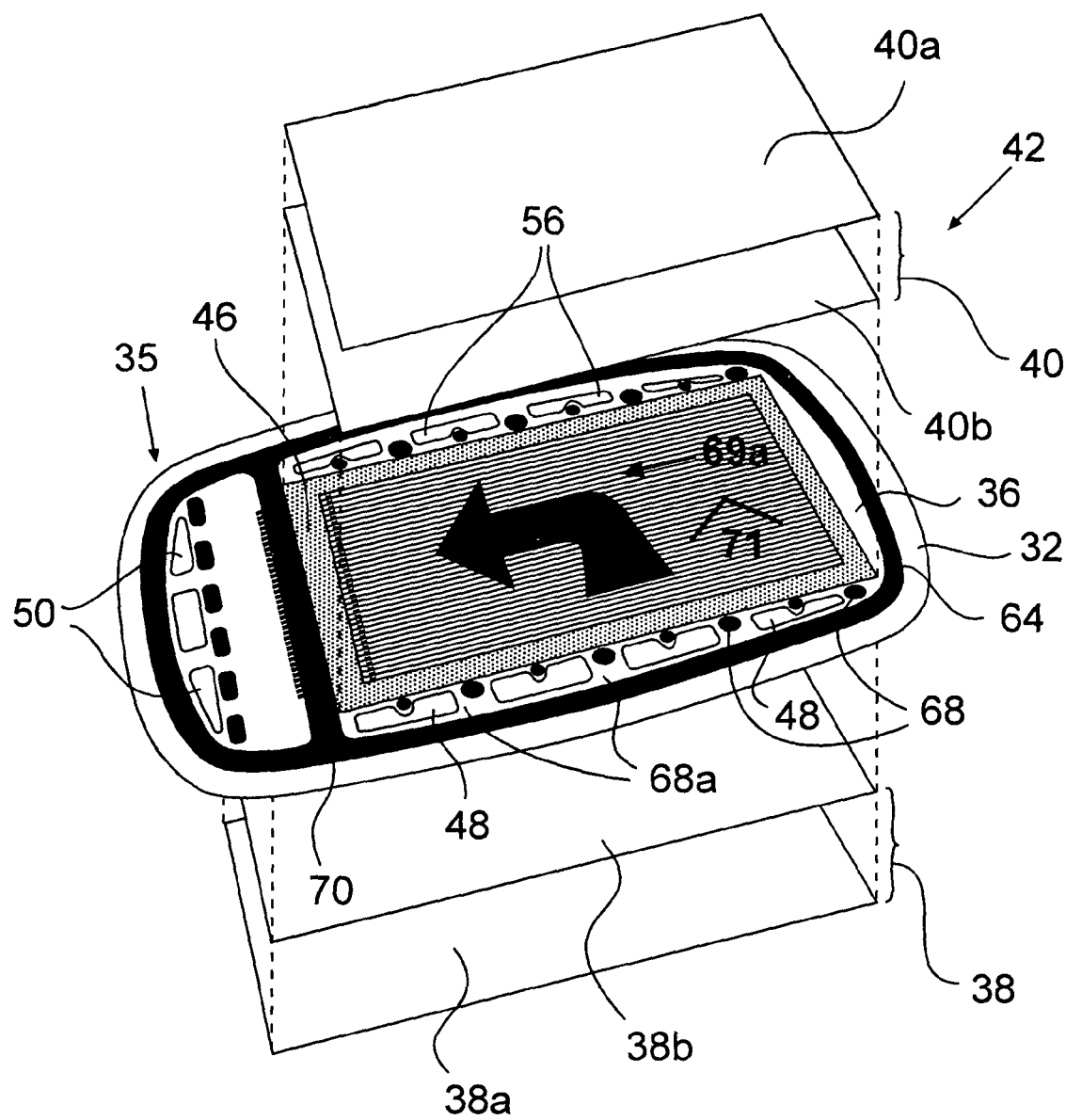
FIG. 3 is an exploded bottom view of the membrane support plate of FIG. 2 shown after being pivoted about holes 50.

Referring to FIGS. 2, and 3, a membrane support plate 32 has a top surface 34 (FIG. 2) and a bottom surface 36 (FIG. 3). The top surface 34 has a relatively large inner dimension (LID) to accommodate a larger membrane structure 38 formed of two membranes 38a and 38b which is larger than the membrane structure 40 formed of two membranes 40a and 40b. The bottom surface 36 has a relatively smaller inner dimension (SID) to accommodate the smaller membrane structure 40. The filtration plate 42 shown in FIGS. 2 and 3 comprises the membrane support plate 32 and the two membrane structures 38 and 40 which are sealed to the entire periphery of the membrane support plate 32 at membrane seal sites 44 and 46. A filtration unit 26 capable of effecting fluid filtration is formed by joining (sealing) two filtration plates 42 to each other at the SID to SID surfaces. A stack of filtration units 26 is formed by joining (sealing) filtration units 26 to each other at the LID to LID surfaces. By sealing the SID to SID surfaces and LID to LID surfaces in this manner, a stack of filtration units 26 (FIG. 1) is formed which is capable of effecting fluid flow therethrough which assures that all incoming fluid feed is passed through a membrane structure 38 or 40 prior to exiting the outlet 30 of the filtration cartridge 20 (FIG. 1) formed from the stack of filtration units 26.

The filtration plate 32 of FIGS. 2 and 3 includes feed inlet holes 48, permeate outlet holes 50 and vent holes 56. In use, feed to the filtration cartridge 20 enters through inlet 28 (FIG. 1) and passes through feed inlet holes 48 as represented in arrow 29. On the SID side (FIG. 3), fluid feed passes through membrane structure 40 to produce a permeate which travels a direction as represented by arrow 58 through grooves 60. The permeate travels through the spaces 68a positioned between posts 68 and then out permeate holes 50 as represented by arrow 35 to the outlet 30 (FIG. 1). On the LID side (FIG. 2), fluid feed passes through membrane structure 38 to produce a permeate which travels in a direction as represented by arrow 69a through grooves 71. The permeate travels out permeate holes 50 as represented by arrow 35.

Figure 4:
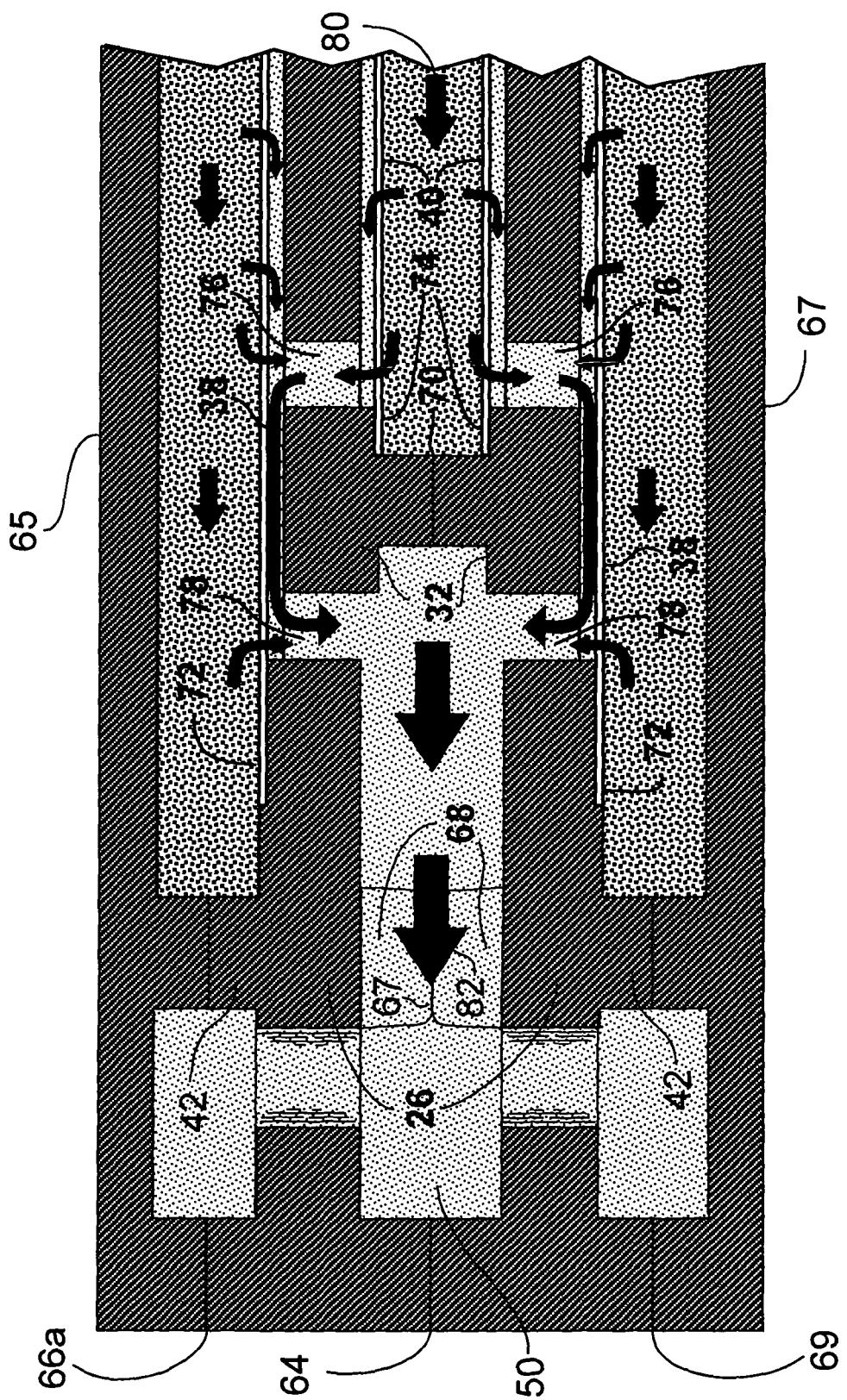
FIG. 4 is a cross sectional view of a filtration cartridge of this invention having one filtration unit taken along line 4-4 of FIG. 2.

Referring to FIG. 4, a filtration unit 26 sealed to end caps 65 and 67 is shown. The filtration unit 26 comprises two filtration plates 42 shown in FIGS. 2 and 3 and are shown at the cross section 4-4 of FIG. 2. The membrane support plates 32 are sealed together at plate seals 64 and 70. Membrane structures 38 are sealed to the membrane plates 32 at membrane seal area 72. Membrane structure 40 is sealed to membrane support plates 32 at membrane seal areas 74. Membrane support plates 32 are provided with an inner row of holes 76 and an outer row of holes 78. As shown by the black arrows in FIG. 4, all incoming feed fluid 80 must pass through membrane structures 38 or 40 prior to being recovered as permeate 82. The filtration units 26 are sealed at their outer periphery at outer plate seal 64 and at an inner periphery at plate seal 70 (FIG. 3) on the SID side and at the outer plate seal 66a and inner plate seal 71 on the LID side (FIG. 2). The seals 70, 64, 71 and 66a are raised from the surfaces surrounding holes 50 (FIGS. 2 and 3) so as to provide flow paths to holes 50. A filtration unit 26 is sealed to end cap 65 at outer peripheral plate seal 66a and to end cap 67 at outer peripheral seal 69. An inlet (not shown) is provided for introducing feed into the filtration units 26. A vent 27 and an outlet 30 also are provided in the manner shown in FIG. 1. The seals 64, 66a and 69 eliminate the need for an additional outer housing to effect desired fluid flow.

Figure 5:
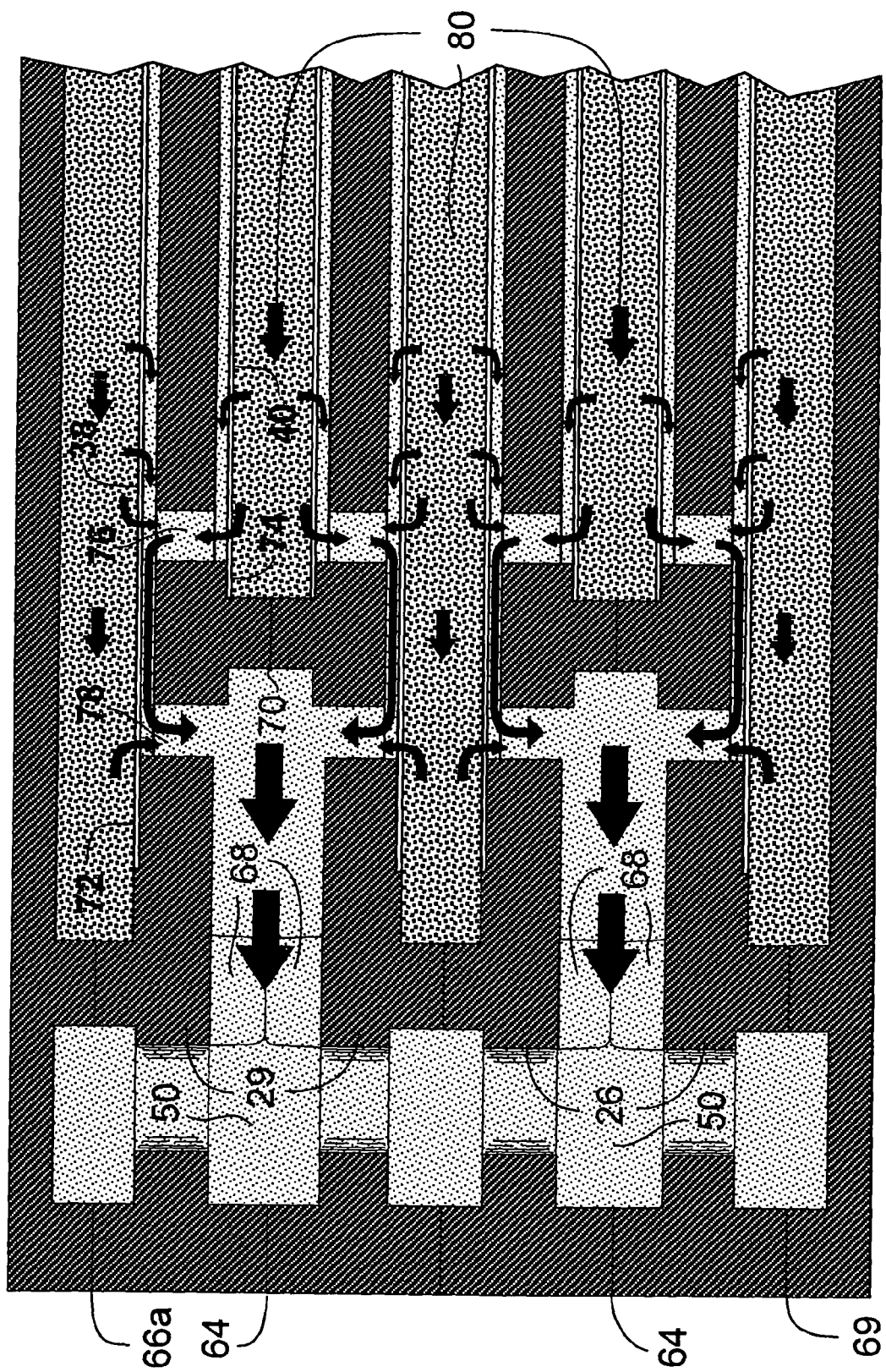
FIG. 5 is a cross-sectional view of a filtration cartridge of this invention having two filtration units taken along line 4-4 of FIG. 2.

Referring to FIG. 5, two filtration units 26, sealed together are shown. In FIG. 5, the reference numbers which are the same reference numbers in FIG. 4 identify the same elements as in FIG. 4. FIG. 5 shows that a plurality of filtration units 26 be stacked and sealed together to form a filtration cartridge 20 (FIG. 1) being free of an additional outside housing.

In use, the integrity of the membrane structures 38 and 40 are tested with a gas such as a binary gas when operating in a TFF mode with vent 27 open. This integrity test is described in U.S. patent application Ser. No. 11/545,738, filed Oct. 10, 2006 which is incorporated herein by reference. The integrity test used on the apparatus of this invention is a test that has been designed to correlate to the removal of small viruses. The initial composition of the two gases is 90% $CO_2$ and 10% hexafluoroethane. This gas mixture is introduced to the feed port on the apparatus. The gas mixture is allowed to sweep across the upstream side of the membrane and bleed out the vent port while maintaining a trans membrane pressure of 50 psi. This sweep is required so that the concentration of the two gases remains constant on the upstream side. A measurement of the composition of the gases is taken downstream. An elevated hexafluoroethane value is indicative of a membrane that will not retain virus.

In subsequent operation, the vent 27 is initially open and fluid feed is introduced through inlet 28 to produce permeate that replaces gas within the filtration cartridge 20. The vent 27 is then closed so that the vent holes 56 (FIGS. 2 and 3) are filled with unfiltered feed fluid. Excess unfiltered feed fluid is removed through outlet 30 over the time filtration is effected. After filtration is effected, unfiltered feed fluid can be drained from the filtration cartridge 20 through vent 27 and outlet 30.

What is claimed:
1. A self contained stacked filtration cartridge (20) free of a separate exterior housing comprising,
   a first end cap (22) and a second end cap (24), wherein one end cap includes a vent (27) for venting gas and the other end cap includes a fluid feed inlet (28) in fluid communication with a fluid permeate outlet (30); and
   a plurality of filtration units (26) stacked between the first and second end caps in fluid communication with the first (22) and second (24) end caps,
   each filtration unit (26) has an outer periphery, an inner periphery and a plurality of filtration plates (42), each filtration plate (42) having a membrane support plate (32),
  each membrane support plate (32) having a bottom surface (36) having a lower filtration membrane structure (40) bonded thereto and a top surface (34) having an upper filtration membrane structure (38) bonded thereto,
wherein the lower filtration membrane structure (40) is smaller in size than the upper filtration membrane structure;
wherein the self contained stacked filtration cartridge (20) is formed by sealing two adjacent stacked filtration units (26) to each other by sealing two adjacent membrane support plates (32) to each other at an outer plate seal (64) and an inner plate seal (70) to prevent fluid feed from entering the fluid outlet (30) except by having passed through at least one of the membrane structures, and sealing adjacent filtration units (26) along (i) the corresponding outer periphery at the outer plate seal (64) and (ii) the corresponding inner periphery at an inner periphery plate seal 70;
wherein the self contained stacked filtration cartridge (20) eliminates the need for an outer housing to effect desired fluid flow, thereby providing a single fluid pathway by preventing fluid feed from entering the fluid permeate outlet (30) except by having passed through at least one of the lower filtration membrane structure or upper filtration membrane structure.

2. The filtration cartridge of claim 1 wherein the membrane support plates include fluid feed, and fluid permeate pathways which permit permeate fluid flow from the top surface and from the bottom surface of each of the membrane support plate to the fluid outlet.

\* \* \* \* \*